May 28, 1946.　　　E. S. HEBELER　　　2,400,993
WELDER'S MASK OR HELMET
Filed Oct. 4, 1943
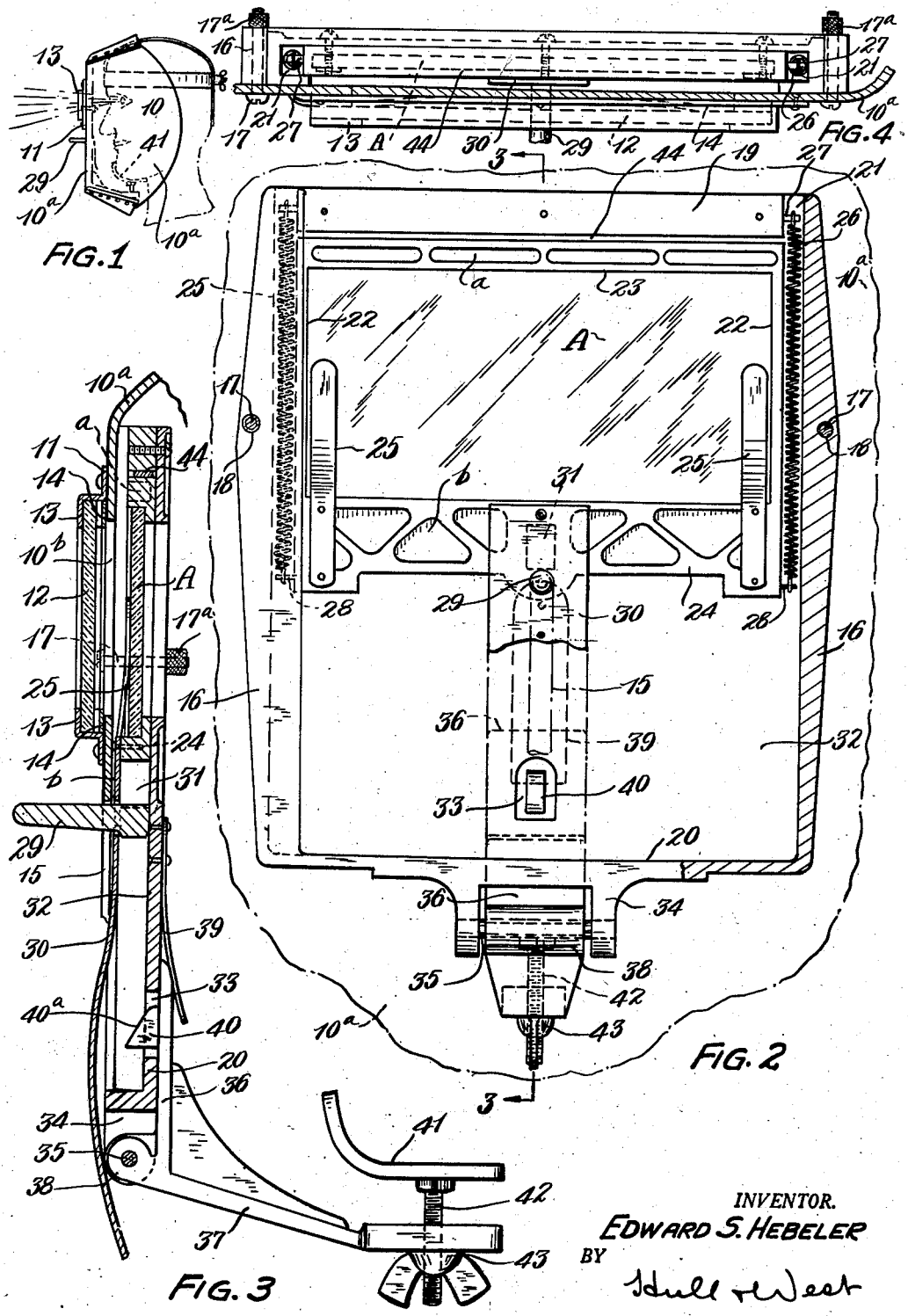
INVENTOR.
EDWARD S. HEBELER
BY
Hull + West
ATTORNEYS Patented May 28, 1946

2,400,993

UNITED STATES PATENT OFFICE 2,400,993

WELDER'S MASK OR HELMET

Edward S. Hebeler, Williamsville, N. Y., assignor of one-half to Unit Rays, Inc., Cleveland, Ohio, a corporation of Ohio Application October 4, 1943, Serial No. 504,868

11 Claims. (Cl. 2—8)

This invention relates to the art of welding, and more particularly to what are known in that art as welders' masks or helmets, which are used by those performing metal welding and cutting operations for the purpose of shielding their eyes from the impact of the brilliant rays emitted during the operations of electric and torch welding, as well as during the operations of torch cutting.

The said masks or helmets are usually provided with a protective shield of transparent material, such as glass or fire resistant transparent plastic material, extending across the vision opening and which will enable the operator to position his welding rod or his torch with reference to the work and also protect his face and eyes against impact by the hot scale produced by the cutting or welding operations and which it is desirable to remove from the work promptly after such operation. In addition, some of the prior masks or helmets have been provided with a shield of partly opaque colored material capable of protecting the eyes of the operator against the brilliance of the light produced by the cutting or welding operation and have also been provided with means whereby this additional glare-proof shield may be moved into and out of register with the protective shield. In all of the masks with which I am familiar and which have been so equipped, the means for interposing the glareproof shield between the eyes of the operator and the work involve the use of mechanism which is liable to cause displacement of the welding rod or torch with reference to the work.

The general purpose and object of my invention is to provide, for a mask or helmet such as described, simple but effective means whereby the glareproof shield may be moved into position between the eyes of the operator and the work without liability of disturbing the positioning of the welding rod or torch with reference to the work. I accomplish this object by means of the construction shown in the drawing forming part hereof, wherein Fig. 1 represents a side elevational view of a welder's mask or helmet constructed in accordance with my invention and illustrating the manner in which the glareproof shield may be operated; Fig. 2 a front elevational view, partly in section, of a frame, indicated as mounted in a portion of the front of the body of a standard type of welder's mask or helmet and having my invention incorporated therewith and therein and showing the positions of the parts when the glareproof shield is in use, the portion of the mask body which covers the lower part of the frame and the transparent pane and its mounting not being indicated; Fig. 3 a sectional view corresponding to the line 3—3 of Fig. 2, and showing the transparent pane and its mounting and the portion of the mask body not indicated in Fig. 2; and Fig. 4 a plan view of the construction shown in Fig. 3.

Describing the various parts by reference characters, 10$^a$ denotes generally the front of the body of the mask or helmet 10. Extending about and in front of the vision opening 10$^b$ is a frame 11 within which the transparent pane 12 is removably mounted. As shown herein, this pane is slidably mounted within top and bottom channeled guides 13, being yieldably held against the front wall of said guides by means of springs 14 pressing at their ends against the portions of the front of the mask to which the said frame is attached. Beneath the frame 11, the mask is provided with a vertical slot 15, the purpose of which will be explained hereinafter.

16 denotes the sides of a frame which is detachably secured to and within the front of the mask by means of screws 17 extending rearwardly through openings 18 in said sides and through registering openings in the front of the mask, nuts 17$^a$ being applied to the rear ends of said screws. The above frame is provided with a cross member 19 connecting the upper ends of the sides thereof and with a cross member 20 connecting the lower ends of the sides. The sides are provided with channeled guides 21 for the reception of the sides of a third frame, which carries the glareproof shield. This third frame comprises side members 22, a top member 23, and a bottom member 24, and the glareproof shield A is yieldably and removably held in contact with the sides 22 of the said frame by means of leaf springs 25, which are secured to the front face of the bottom cross member 24. This manner of mounting the glareproof shield enables the latter to be easily removed and replaced by another shield, should the occasion for such substitution arise.

26 denotes coiled springs which are mounted in the channels 21, each having its upper end connected to an anchor 27 in the upper portion of its respective channel while its lower end is connected to an anchor 28 secured to and projecting from the bottom frame member 24. 29 denotes an operating handle or stud formed with or otherwise secured to the bottom frame member 24 and projecting forwardly through the slot 15. A shield 30 of suitable pliable material, the lower portion whereof is broken away in Fig. 2, is secured to the front of the bottom member 24 of the frame and covers the slot 15, shown in dot-and-dash lines in Fig. 2, the operating handle or stud 29 projecting through an aperture provided therefor in the said shield. A locking aperture 31 is provided in the bottom frame member 24 above the stud 29.

The lower part of the frame comprising the sides 16, top member 19 and bottom member 20, is closed by a plate 32 located rearwardly of the frame 22—24 and having an opening 33 therein located midway between the sides thereof and a short distance above the bottom member 20. The central portion of the bottom member 20 of the frame is provided with downwardly extending bearing legs 34 in which a shaft 35 is journaled, the said shaft having mounted thereon detent mechanism to cooperate with the abutment formed by the bottom wall of the aperture 31 for the purpose of holding the frame 22—24 and the glareproof shield therein in their lowered or inoperative positions. The detent mechanism referred to comprises in part an angle lever having a vertical arm 36 and a rearwardly extending arm 37, being provided with a hub 38 whereby the lever is mounted upon the shaft 35. It also includes a leaf spring 39, shown in dot-and-dash lines in Fig. 2, which is secured to the rear side of the plate 32 above the top of the lever arm 36 and which exerts a pressure on the top of the latter with its lower end, thereby tending to hold the said arm in contact with the plate 32. It will be noted that the arm 36 carries a detent 40 which is of sufficient length to project through and beyond the aperture 33, the plate constituting a stop to limit the forward movement of the arm and detent. The detent has an inclined edge 40ª which is adapted to be engaged by the central lower portion of the frame member 24 as the shield is moved downwardly by the handle or stud 29, thereby to cam the detent out of the way until the opening 31 registers therewith, whereupon the spring 39 will force the upper end of the arm 36 forwardly, causing the detent to enter the aperture 31, with its lower edge engaging the abutment constituted by the bottom wall of said aperture thereby to hold the glareproof shield and its frame in lowered or inoperative position.

The angle lever of the detent mechanism forms part of the means whereby the operator may use his chin as a means for releasing the detent 40 when the torch is properly positioned with reference to the work. The other part of said means consists of a chin rest comprising a plate 41 having its forward portion curved upwardly to conform more or less to the front portion of the chin of the operator, the said plate having a screw bolt 42 secured thereto and threaded into an aperture provided therefor in the rear end of the lever arm 37. By rotating the plate 41 it can be raised and lowered with reference to the lever arm 37, thereby to accommodate the same to the facial contour of the particular operator who may be using the mask. The lower end of the bolt is shown as provided with a wing nut 43 whereby the plate 41 may be locked in any position to which it may be adjusted.

With the parts constructed and arranged as described, it is believed that the operation will be readily understood. The plate 41, having been adjusted so that, when the frame is in its lowered position, it can be lightly engaged by the chin of the operator when the mask is applied to his head, the glareproof shield at this time will be held in its downward position by engagement of the detent 40 with the bottom wall of the aperture 31. When the welding rod or torch has been placed in the desired starting position with reference to the work to be welded or cut, a slight depression of the chin will rock the lever arm 37 downwardly and the arm 36 rearwardly against the action of the spring 39, thereby disengaging the detent 40 from engagement with the bottom wall of the aperture 31, whereupon the springs 26 will operate to lift the glareproof shield into register with the vision opening, there being a buffer 44 of suitable material, such as rubber, secured to the bottom of the frame member 19 for engagement by the upper edge of the frame of the glareproof shield when the latter registers with the vision opening.

Having thus described my invention, what I claim is:

1. A welder's mask or helmet having a vision opening therein, a glareproof shield reciprocably mounted at the rear of said opening and movable upwardly into, and downwardly out of, registration with said opening, spring means connected with said shield and tending to move the same upwardly into registration with said opening, a locking member below the said shield and movable therewith, a pivotally supported arm located rearwardly of said shield and having a cooperating locking member, one of said members being a detent and the other of said members being an abutment, and the locking member of the arm being positioned to engage the other locking member when the shield is in its lowered position, a spring tending to move said arm forwardly, thereby to bring the locking members into engagement with each other, and chin-actuable means for rocking the said arm against the action of said spring.

2. A welder's mask or helmet having a vision opening therein, a glareproof shield reciprocably mounted at the rear of said opening and movable upwardly into, and downwardly out of, registration with said opening, spring means connected with said shield and tending to move the same upwardly into registration with said opening, a locking abutment below the said shield and movable therewith, a pivotally supported arm located rearwardly of said shield, a detent on said arm adapted to engage the said abutment when the shield is in its lowered position, a spring for moving the said arm forwardly thereby to bring the detent into engagement with the said abutment, and chin-actuable means for rocking the said arm thereby to disengage the detent thereon from said abutment.

3. A welder's mask or helmet having a vision opening therein, vertical guide members located on opposite sides of said opening and extending therebelow, a frame reciprocably mounted in said guide members, a glareproof shield mounted in said frame and adapted, by the movement of said frame, to be brought into and out of register with the said vision opening, spring means for raising said frame, bearings located below the said opening, a shaft mounted in said bearings, an angle lever on said shaft and comprising an upwardly extending arm provided with a locking member, the portion of said arm which is provided with the locking member being located rearwardly of said frame, the said angle lever also comprising a rearwardly extending arm, a chin rest carried by said rearwardly extending arm, spring means cooperating with said angle lever to press forwardly the portion of the first arm which is provided with the locking member, and a cooperating locking member carried by said frame and adapted to be engaged by the first-mentioned locking member when the said frame is in its lowered or inoperative position.

4. A welder's mask or helmet having a vision opening therein, vertical guide members located on opposite sides of said opening and extending therebelow, a frame reciprocably mounted in said guide members, a glareproof shield mounted in said frame and adapted, by the movement of said frame, to be brought into and out of register with the said vision opening, spring means for raising said frame, a plate below the vision opening and located rearwardly of the frame when the latter is in its lowered position, the said plate having an opening therein above the bottom thereof, bearings located below the said opening, a shaft mounted in said bearings, an angle lever on said shaft and comprising an upwardly extending arm at the rear of the said plate provided with a detent projecting through the opening in said plate, the said angle lever also comprising a rearwardly extending arm, an adjustable chin rest carried by said rearwardly extending arm, and spring means engaging the first mentioned lever arm and normally projecting the detent through the opening in said plate, the frame being provided with an abutment below the shield therein adapted to be engaged by the said detent when the frame is in its lowered or inoperative position.

5. A welder's mask or helmet having a vision opening therein and vertical guide members located on opposite sides of said vision opening and extending therebelow, a frame reciprocably mounted in said guide members, a glareproof shield in said frame, the said frame being provided with a locking member, coiled springs having their upper ends anchored to the guide members above the said vision opening and their lower ends connected respectively with opposite side portions of the said frame, a plate extending below the vision opening and located rearwardly of the frame when the latter is in its lowered position, a pivotally supported arm located rearwardly of the said plate and provided with a locking member, a leaf spring secured at one end to the said plate and having its free end engaging the swinging end of said arm thereby normally to retain the same in engagement with the rear wall of said plate, the said plate having an opening therethrough above the bottom thereof with which the locking member on said arm is adapted to register and the said opening being so located as to enable the said locking members to engage each other when the said frame is in its lowered or inoperative position, and means for rocking the said arm against the action of the said spring.

6. A welder's mask or helmet having a vision opening therein and vertical guide members located on opposite sides of said vision opening and extending therebelow, a frame reciprocably mounted in said guide members, a glareproof shield in said frame, the said frame being provided with a locking abutment, coiled spring means for raising said frame, a plate secured to said guide members below the vision opening and extending downwardly therefrom, a pivotally supported arm located rearwardly of the said plate, a leaf spring secured at one end to the said plate and having its free end engaging the said arm thereby normally to retain the same in engagement with the rear wall of said plate, the said plate having an opening therethrough above the bottom thereof and the said arm having a detent adapted to project through the said opening and beyond the front face of the said plate, the said opening and detent being positioned to enable the detent to engage the abutment when the said frame is in its lowered or inoperative position, and means for rocking the said arm against the action of the said spring.

7. In the welder's mask or helmet set forth in claim 6, the means for rocking the said arm comprising a rearward extension thereof and a chin engageable member carried thereby.

8. A welder's mask or helmet having a vision opening in the front portion thereof and provided with a vertical slot extending downwardly from said opening, a glareproof shield, a frame therefor reciprocably mounted at the rear of said vision opening and movable upwardly thereby to bring the shield into registration with said opening and movable downwardly thereby to bring the shield out of registration with said opening, spring means connected to said frame and tending to move the same upwardly, a locking member carried by said frame, a cooperating locking member located rearwardly of the said shield when the latter is in its lowered position, spring means tending to move the second locking member into engagement with the first locking member, an operating handle or stud connected to the lower portion of the said frame and projecting through the said slot, and a shield for said slot through which the stud or handle projects, the said shield being secured to the lower portion of the front of said frame and adapted to cover said slot during the movements of said frame.

9. A welder's mask or helmet having a vision opening therein, a glareproof shield reciprocably mounted at the rear of said opening and movable upwardly into, and downwardly out of, registration with the opening, spring means connected with said shield and tending to move the same upwardly into registration with said opening, a locking member for and movable with said shield, a pivotally supported arm having a cooperating locking member located and adapted to engage the former locking member when the shield is in its lowered position, a spring tending to move said arm forwardly thereby to yieldably retain the locking members in engagement with each other, stop means for limiting the forward movement of said arm, and chin-actuable means for rocking the said arm against the action of said spring.

10. A welder's mask or helmet having a vision opening therein, a glareproof shield reciprocably mounted at the rear of said opening and movable upwardly into, and downwardly out of, registration with the opening, spring means connected with said shield and tending to move the same upwardly into registration with said opening, a locking member for and movable with said shield, said locking member comprising an abutment for engagement by a detent, an arm pivotally mounted below the said shield, a detent on said arm adapted to engage the said abutment when the shield is in its lowered position, a spring for moving the said arm forwardly, thereby to bring the detent into engagement with the said abutment, a stop for limiting the forward movement of the said arm, and chin-actuable means for rocking the said arm thereby to disengage the detent thereon from said abutment.

11. A welder's mask or helmet having a vision opening therein, vertical guide members located on opposite sides of said opening and extending vertically therefrom, a frame reciprocably mounted in said guide members, the said frame comprising top, bottom, and opposed side members, the said members being recessed to provide a seat for the reception of a glareproof shield, a glareproof shield in said seat, one or more leaf springs secured to and projecting upwardly from the bottom member of the said frame with the upper end or ends thereof engaging the said shield, thereby to yieldingly retain the shield in the said seat, a coil spring located in each of said vertical guide members, the lower ends of the springs being connected to opposite sides of the bottom member of said frame and their upper ends being supported above the top of the vision opening, said coil springs tending to move the frame into registration with said opening, a locking member carried by said frame, and a cooperating locking member adapted to engage the former locking member when the frame is moved to a position whereby the frame and the shield therein will be out of registration with the said opening.

EDWARD S. HEBELER.